Patented Feb. 8, 1944

2,341,377

UNITED STATES PATENT OFFICE 2,341,377

BARBECUE FUEL

Harvey M. Hinderer, Ferguson, Mo.

No Drawing. Application October 31, 1942,
Serial No. 464,135

19 Claims. (Cl. 44—15)

This invention relates to the process of barbecuing meats, and particularly to an improved fuel for this purpose.

The process of barbecuing meat generally involves cooking meat in the presence of the smoke and vapor produced by the combustion of certain types of wood. Wood used for this purpose is selected for its ability to yield upon combustion a smoke and vapor containing substances which impart a delectable and very highly desired flavor to the meat. The wood predominantly used for this purpose is hickory. Occasionally, a mixture of hickory, sassafras and certain types of pine wood are employed.

The common practice in barbecuing meats is to burn large quantities of hickory logs and branches in a suitable stove or "barbecue pit" and allow the heat, smoke and vapor to contact portions of meat, such as ribs or steaks, until the meat is cooked and flavored to the desired extent. This process frequently results in a blackening of the meat or an over-flavoring of the meat before the cooking process is completed. Such results, although frequently encountered, are highly undesirable.

Various modifications of this process have been attempted. For example, a bed of coals may be produced by burning common woods until the smoke and vapors have passed off. Branches of hickory wood may then be placed on the coals to produce the smoke and vapors for curing and flavoring the meat. In this case, the cooking process is accomplished by the hot coals. These methods for barbecuing meat possess several disadvantages, in addition to the lack of control of the process which frequently results in the blackening of the meat. First, hickory wood is generally not available, except in a limited number of localities where it is a natural growth. Second, the use of hickory logs is not economical, since large quantities are consumed in a single operation of barbecuing. Efforts have been made to render the process of barbecuing meats economical and efficient by providing specially adapted stoves or furnaces in which a smaller quantity of hickory wood is required to produce the same desirable results. For example, the furnace disclosed in U. S. Patent No. 2,168,388, issued August 8, 1939, to Bemis provides a retort in which hickory wood can be heated and the smoke and vapor therefrom directed to the meat without mixing with the undesired smoke from the common wood used as the source of fuel for cooking the meat. The furnace required for this purpose, however, is elaborate and costly, and is not practical for simple outdoor camping trips and home entertainment.

Meat can only absorb a certain amount of hickory smoke and vapor, and the cooking of the meat requires a certain amount of heat, depending upon the kind, size, thickness and age of the meat. It is exceedingly difficult for the average person to control simultaneously the degree of cooking and the degree of curing of meat with the barbecuing fuels available in the art. Meat barbecued by the average person under these conditions is usually either partly raw, bitter-flavored and blackened or tough, hard and sour.

One of the objects of this invention is to provide an economical fuel for barbecuing meat.

Another object is to provide a barbecue fuel which can be used to barbecue meat in any type of oven, stove, fireplace or furnace, without the use of an auxiliary fuel.

Another object is to provide an economical and readily marketable barbecue fuel which simultaneously cooks and flavors meat.

A further object is to provide an economical and readily marketable barbecue fuel which can be used directly in proportion to the quantity, size and kind of meat.

A further object is to provide a more efficient and effective barbecue fuel.

Other objects and advantages of the invention will become apparent as the following description is read:

The invention, generally stated, comprises the provision of a barbecue fuel by thoroughly mixing certain proportions of selected comminuted woods, such as hickory and sassafras, and comminuted wood charcoal, and forming the mixture into patties or molding the mixture into briquettes. In the mixing operation a suitable fluid, such as water, may be employed to aid in the blending of the ingredients and the formation of the mixture into unit masses of fuel. It is one of the features of this invention, however, that the mixture may be satisfactorily molded into briquettes without the aid of a fluid. Liquids, such as fuel oil, liquid paraffin and others which produce smoke and vapors, possessing characteristic aromas, are undesirable for this purpose and should be avoided. While a suitable binding material may be employed in the mixture prior to the formation of unit masses of fuel, it is essential to avoid the use of substances which may interfere with the development of the essential smoke and vapors or impart flavors or aromas which destroy or mask the desirable effects resulting from the smoke and vapors of the selected woods generally employed in barbecuing meats.

It is further an essential feature of this invention that comminuted hickory wood and charcoal can be formed into a compact coherent mass, which can be ignited by means of a flame from a single match and which will thereafter provide self-supporting, uniform combustion with the development of a hot, uniform heat and the evolution of sufficient smoke and vapor to properly and adequately cook and flavor meat.

It has been discovered that comminuted hickory and wood charcoal may be molded satisfactorily into coherent briquettes when mixed in proportions in the range from five per cent. hickory wood and ninty-five per cent. charcoal to approximately ninety per cent. hickory wood and ten per cent. charcoal, depending upon the degree of fineness of the respective components. It is desirable to use a charcoal which has been thoroughly burned to eliminate smoke and vapor-producing substances which could influence the flavor produced in barbecuing meats with the product of this invention. This is true, unless charcoal made from hickory wood is utilized. In that event, the charcoal may be somewhat green but not to the extent that the material ceases to have the property of cooperating with hickory sawdust or flour to produce a briquette which will resist disintegration upon handling and shipping, nor to the extent that the briquette thus produced will not be capable of supporting combustion with the continued presence of an exterior source of heat.

The nature and degree of comminution of the hickory wood has been found to influence the ratio of wood to charcoal which can be molded satisfactorily and which will burn uniformly and consistently. Coarse hickory wood sawdust is desirably mixed with a greater quantity of charcoal, in order to provide a composition capable of being molded into briquettes which will resist disintegration by handling and at the same time provide uniform self-supporting combustion. A ratio of ten parts by volume of coarse hickory sawdust to ninety parts by volume of sixty to one hundred mesh wood charcoal has been found to produce desirable results in this respect. On the other hand, a ratio of equal parts by volume of fine hickory sawdust and coarse wood charcoal have been found satisfactory. A coarse, granular charcoal, for example, 40–60 mesh has been found particularly desirable for admixture with an equal volume of hickory flour, for example, 100–200 mesh. The criteria of a satisfactory briquette for the purposes of this invention have been found to be a degree of porosity sufficient to insure ready combustion and a degree of compactness sufficient to provide resistance to disintegration on handling. While this degree of porosity can vary considerably, it is believed to be adequately demonstrated in briquettes prepared according to the proportions given in the above-mentioned examples. When patties are prepared instead of briquettes, the degree of porosity may be achieved more readily and over a wider range in proportions of ingredients and particles sizes of the respective components. It has also been found possible to provide a range of particle sizes for the respective ingredients of the mixture with desirable results. These variations will be readily understood by those skilled in the art in view of the present description of the invention.

When water is used in preparing the mixture of hickory sawdust and charcoal, the quantity of water employed may be varied from that just sufficient to dampen the components to that necessary to thoroughly wet them, depending upon whether the mixture is to be formed into patties or molded into briquettes. If water is employed, the final product is desirably dried to atmospheric conditions. This may be undertaken either before or after the mixture is formed into unit masses of fuel.

As an additional component, a suitable binding agent may be incorporated in the mixture, although this has not been found absolutely essential. Proteinaceous binding agents, such as gelatin and glue, are desirably avoided, since upon combustion they are likely to impart smoke and vapor of a type detrimental in the flavoring of meat. Gums, such as tragacanth and gum arabic, starches, dextrins and other carbohydrate substances may be employed as binding agents. These substances, when used in small quantities, do not materially influence the flavor of the barbecued meat. Alkaline binding agents, such as alkali metal bicarbonates, carbonates, silicates and hydroxides, may be employed in small quantities to modify the degree of coherence of the components and the degree of porosity of the briquette. If used in larger quantities, they may impede the combustion of the briquette. Furthermore, when used in substantial amounts, as for example, five per cent. of the weight of hickory wood or greater, there is a tendency for the alkaline agent to accelerate the evolution of smoke and vapor with the result that the curing qualities of the hickory wood present in the briquette may be exhausted in advance of the completion of the cooking process. Furthermore, the rapid evolution of the smoke may tend to blacken the meat. The flavor, aroma and texture under such circumstances are not as desirable as when the curing and cooking take place simultaneously at a uniform rate.

It has been found that a uniform, simultaneous curing and cooking of meat is best achieved when the product of this invention consists of a briquette containing proportions of hickory sawdust and charcoal in the ratio of 30–70 parts of hickory to 70–30 parts of charcoal respectively. An example of a suitable embodiment of this invention is provided, as follows:

Two parts by volume of air-dried hickory sawdust of approximately 30–60 mesh are mixed with three parts by volume of 40–100 mesh thoroughly coked wood charcoal in a rotating drum until the mass appears uniform in color and texture. To the blended mixture may be added one-fourth part by volume of tap water and the mixture again tumbled in the drum until the water has been uniformly distributed throughout the mass. The blend is then formed into patties approximately four inches in diameter and one inch in thickness. For this purpose a mold of suitable construction may be employed, for example, a hinge type mold. The patties are then allowed to dry in the mold to atmospheric conditions. The drying may be accelerated by placing the patties in an oven at 100° C. for two to four hours. The dried patties may be used in their original size or may be readily broken by hand into smaller sizes. In this manner portions of a patty may be employed to provide a desired amount of fuel, as for example, when only one or two small, thin steaks are to be barbecued.

In the preparation of briquettes instead of patties the above example may be followed with the reduction of the water content to one-eighth part by volume for the proportions of components described. The mixture thus prepared may be molded in a suitable briquetting apparatus under pressures from 20–60 pounds per square inch. This pressure may be varied for different particle sizes of the components and particular ratios of ingredients. Excessive pressures which tend to produce a glazed or impervious briquette are to be avoided. Resistance to disintegration on handling may be augmented if desired by incorporating in the mixture from one-fourth to one per cent. by weight of dextrin or one-half to one per cent. of soda ash. These binding agents are desirably dissolved in water before used.

The barbecue fuel prepared according to the present invention has the advantage of being clean, efficient, economical and readily marketable fuel. Moreover, the process of barbecuing meat with this fuel can be practiced with a relatively high degree of control in the quantity of fuel employed for a given amount of meat. It has been found that with the use of this fuel a small handful of briquettes will be sufficient to properly barbecue as many as six small steaks or chops in less than twenty minutes from the time the fuel is ignited.

It will be understood that the barbecue fuel of this invention may be used for barbecuing many varieties or cuts of meat, including domestic or wild fowl, game and fish and that variations in the mixing of the ingredients and formation of the unit masses of fuel are within the scope of this invention, when a fuel of the type described herein and covered by the claims results from such variations.

While hickory wood is the wood predominantly employed in barbecuing meats, other woods, such as sassafras, which possesses the property of imparting desirable flavors and aromas to meat when employed in the barbecuing process, may also be used in the provision of the product of this invention, either as the sole flavor-producing agent or in various combinations with hickory, sassafras and other woods suitable for imparting desirable flavor and aroma to meat in a barbecuing process.

The term "comminuted" is employed in the specification and claims to denote a state of subdivision ranging from coarse and granular to powdered and including narrow or wide ranges in the particle sizes present in a particular batch of a component. The binding agent, when employed in preparing the barbecue fuel of this invention is considered merely as an aid to cohesion of the particles of the blend. The term "meat-curing woods" is employed to denote a single wood or a blend of two or more woods selected to produce a particular flavor in the cured meat.

As an alternative to the use of meat-curing woods as components of the barbecue fuel of this invention, a liquid concentrate of meat-curing substances may be employed. Such a concentrate may be prepared by condensing the vapors and smoke obtained by carbonizing hickory and other meat-curing woods in a retort to which heat is applied. As an alternative, the vapors may be passed into water to produce a saturated solution of the meat-curing substances. The vapors may be produced either in the presence or absence of air by any means desired. These variations in procedure are known to those skilled in the art and may be utilized to provide a variation in the flavors which may be produced when the concentrate is employed to cure meats.

The liquid concentrate is desirably blended with the comminuted charcoal in a ratio which will insure the presence in the completed fuel of an adequate amount of the meat-curing principles to endure throughout the cooking period, so that the meat will be cooked and cured simultaneously. It has been found that a ratio selected from the range of 50–80 parts of comminuted charcoal and the balance, liquid concentrate, will blend to produce a mixture which can be molded satisfactorily under pressure into a semi-porous, rigid briquette. Briquettes prepared in this manner have been found satisfactory for the barbecuing of meat.

The meat-curing concentrate may be prepared in any manner desired and may be compounded from individual ingredients in any manner known to those skilled in the art. The concentrate may be absorbed in a suitable material, such as hickory-wood sawdust or flour, fuller's earth or other materials, and the absorbent may then be blended with comminuted charcoal and molded to produce the barbecue fuel of this invention.

As an example of a barbecue fuel made with the liquid concentrate, 70 parts by volume of 60–100 mesh charcoal are blended in a rotary drum with 30 parts by volume of a liquid concentrate prepared by condensing the vapors from the destructive distillation of hickory wood. The blend is then molded in a briquette machine into unit masses of fuel. A small handful of these briquettes when ignited have been found sufficient to barbecue four small steaks satisfactorily within twenty-five minutes from the time the fuel was ignited.

Those skilled in the art will readily understand that the process and manufacture may be modified and varied to provide a desired set of properties in the ultimate products, or in the interest of economy, without departing from the spirit of this invention, and it is therefore to be distinctly understood that the invention is not limited to the details of the foregoing disclosure, except as indicated in the appended claims.

The invention having thus been described, what is claimed is:

1. A barbecue fuel comprising 10–95% of comminuted charcoal and 90–5% of substances capable of curing meat, the said materials being in a state of admixture, molded into a coherent unit mass and dried to a stable atmospheric moisture content.

2. A barbecue fuel comprising 5–90% of comminuted meat-curing woods and 95–10% of comminuted charcoal, the said materials being in a state of admixture, molded into a coherent unit mass and dried to a stable atmospheric moisture content.

3. A barbecue fuel comprising 30–70 parts by volume of comminuted meat-curing woods and 70–30 parts by volume of comminuted charcoal, the said materials being in a state of admixture, moistened uniformly with water, molded into a coherent unit mass and dried to a stable atmospheric moisture content.

4. A barbecue fuel comprising 30–70 parts by volume of comminuted meat-curing woods and 70–30 parts by volume of comminuted charcoal, the said materials being in a state of admixture together with a carbohydrate binding agent, moistened uniformly with water, molded into a coherent unit mass and dried to a stable atmospheric moisture content.

5. A barbecue fuel comprising 30-70 parts by volume of comminuted meat-curing woods and 70-30 parts by volume of comminuted charcoal, the said materials being in a state of admixture together with an alkaline alkali-metal salt binding agent, moistened uniformly with water, molded into a coherent unit mass and dried to a stable atmospheric moisture content.

6. A barbecue fuel comprising 5-90% of comminuted hickory wood and 95-10% of comminuted charcoal, the said materials being in a state of admixture, molded into a coherent unit mass and dried to a stable atmospheric moisture content.

7. A barbecue fuel comprising 30-70 parts by volume of comminuted hickory wood and 70-30 parts by volume of comminuted charcoal, the said materials being in a state of admixture, moistened uniformly with water, molded into a coherent unit mass and dried to a stable atmospheric moisture content.

8. A barbecue fuel comprising 5-90% of comminuted meat-curing woods and 95-10% of charcoal, the said materials being in a state of admixture, molded under pressure into a coherent unit mass and dried to a stable atmospheric moisture content.

9. A barbecue fuel comprising 30-70 parts by volume of comminuted hickory wood and 30-70 parts by volume of charcoal, the said materials being in a state of admixture, moistened uniformly with water, molded under pressure into a coherent unit mass and dried to a stable atmospheric moisture content.

10. A barbecue fuel comprising a semi-porous rigid unit mass containing 5-90% of comminuted meat-curing woods and the balance comminuted wood charcoal, said materials being in a state of admixture and dried to a stable atmospheric moisture content.

11. A barbecue fuel comprising a semi-porous briquette containing two parts by volume of 30-60 mesh hickory wood sawdust and 5-10 parts by volume of 40-100 mesh wood charcoal.

12. A barbecue fuel comprising a semi-porous briquette containing three parts by volume of 100-200 mesh hickory wood flour and 2-4 parts by volume of 40-60 mesh wood charcoal.

13. The process of preparing a barbecue fuel comprising blending comminuted meat-curing woods with comminuted wood charcoal in a ratio selected from the range of 30-70 parts by volume of comminuted woods and 70-30 parts by volume of comminuted charcoal, molding portions of the blend into semi-porous, rigid masses and drying said unit masses to a stable atmospheric moisture content.

14. The process of preparing a barbecue fuel comprising blending comminuted hickory wood with comminuted wood charcoal in a ratio selected from the range of 30-70 parts by volume of comminuted wood and 70-30 parts by volume of comminuted charcoal, moistening the blend uniformly with water, molding portions of the blend into semi-porous, rigid unit masses under pressure and drying said unit masses to a stable atmospheric moisture content.

15. The process of preparing a barbecue fuel comprising blending comminuted hickory wood with comminuted wood charcoal in a ratio selected from the range of 30-70 parts by volume of comminuted wood and 70-30 parts by volume of comminuted charcoal, moistening the blend uniformly with water containing a carbohydrate binding agent, molding portions of the blend into semi-porous, rigid unit masses under pressure and drying said unit masses to a stable atmospheric moisture content.

16. The process of preparing a barbecue fuel comprising blending comminuted hickory wood with comminuted wood charcoal in a ratio selected from the range of 30-70 parts by volume of comminuted wood and 70-30 parts by volume of comminuted charcoal, moistening the blend uniformly with water containing an alkaline alkali-metal salt binding agent, molding portions of the blend into semi-porous, rigid unit masses under pressure and drying said unit masses to a stable atmospheric moisture content.

17. A barbecue fuel comprising 50-80 parts by volume of comminuted charcoal and 50-20 parts by volume of a liquid concentrate of meat-curing substances, the said materials being in a state of admixture, molded into a coherent unit mass and dried to a stable atmospheric moisture content.

18. A barbecue fuel comprising 50-80 parts by volume of comminuted charcoal and 50-20 parts by volume of a comminuted material saturated with a liquid concentrate of meat-curing substances, the said materials being in a state of admixture, molded into a coherent unit mass and dried to a stable atmospheric moisture content.

19. The process of preparing a barbecue fuel comprising blending comminuted wood charcoal with a liquid concentrate of meat-curing substances in a ratio selected from the range of 50-80 parts by volume of comminuted charcoal and 50-20 parts by volume of said liquid concentrate, molding portions of the blend into semi-porous, rigid unit masses under pressure and drying said unit masses to a stable atmospheric moisture content.

HARVEY M. HINDERER.